(12) United States Patent
Omichi

(10) Patent No.: US 7,453,649 B2
(45) Date of Patent: Nov. 18, 2008

(54) ZOOM LENS AND IMAGE PICKUP DEVICE

(75) Inventor: Hiroshi Omichi, Tokyo (JP)

(73) Assignee: Sony Corporation (JP)

( * ) Notice: Subject to any disclaimer, the term of this patent is extended or adjusted under 35 U.S.C. 154(b) by 30 days.

(21) Appl. No.: 11/503,969

(22) Filed: Aug. 15, 2006

(65) Prior Publication Data

US 2007/0047104 A1   Mar. 1, 2007

(30) Foreign Application Priority Data

Aug. 23, 2005  (JP) .............................. 2005-241460

(51) Int. Cl.
*G02B 15/14* (2006.01)
(52) U.S. Cl. ...................... 359/687; 359/686
(58) Field of Classification Search ................ 359/676, 359/686, 687
See application file for complete search history.

(56) References Cited

U.S. PATENT DOCUMENTS

| 7,245,442 | B2 * | 7/2007 | Ohtake ...................... 359/687 |
| 2005/0088756 | A1 * | 4/2005 | Yamada ..................... 359/687 |
| 2005/0190458 | A1 * | 9/2005 | Hamano et al. ............ 359/687 |

FOREIGN PATENT DOCUMENTS

| JP | 03-033710 A | 2/1991 |
| JP | 06-060971 B2 | 8/1994 |
| JP | 08-005913 A | 1/1996 |
| JP | 09-304699 A | 11/1997 |

OTHER PUBLICATIONS

European Search Report, Application No. 06017247.5-2217, Dec. 7, 2006.

* cited by examiner

*Primary Examiner*—Darryl J Collins
(74) *Attorney, Agent, or Firm*—Rader Fishman & Grauer PLLC; Ronald P. Kananen

(57) ABSTRACT

A zoom lens includes 10 or less lens elements and having a zoom ratio of more than 20×, said zoom lens having first, second, third, and fourth groups of lens elements placed in turn from object side to image side; wherein the first group of lens elements has positive refractive power and is fixed in position during zooming; wherein the second group of lens elements has negative refractive power and is moved in position during zooming; wherein the third group of lens elements has positive refractive power, includes at least one aspheric surface, and is fixed in position during zooming; wherein the fourth group of lens elements has positive refractive power, includes at least one aspheric surface, corrects variations in image surface position during zooming, and performs focusing; and wherein the zoom lens satisfies the following conditional expression (1):

$$7.8 < \frac{dz}{fw} < 8.8 \quad (1)$$

where dz is the movable distance of the second group of lens elements to perform zooming and fw is the focal distance of the whole lens system at a wide angle end.

13 Claims, 13 Drawing Sheets

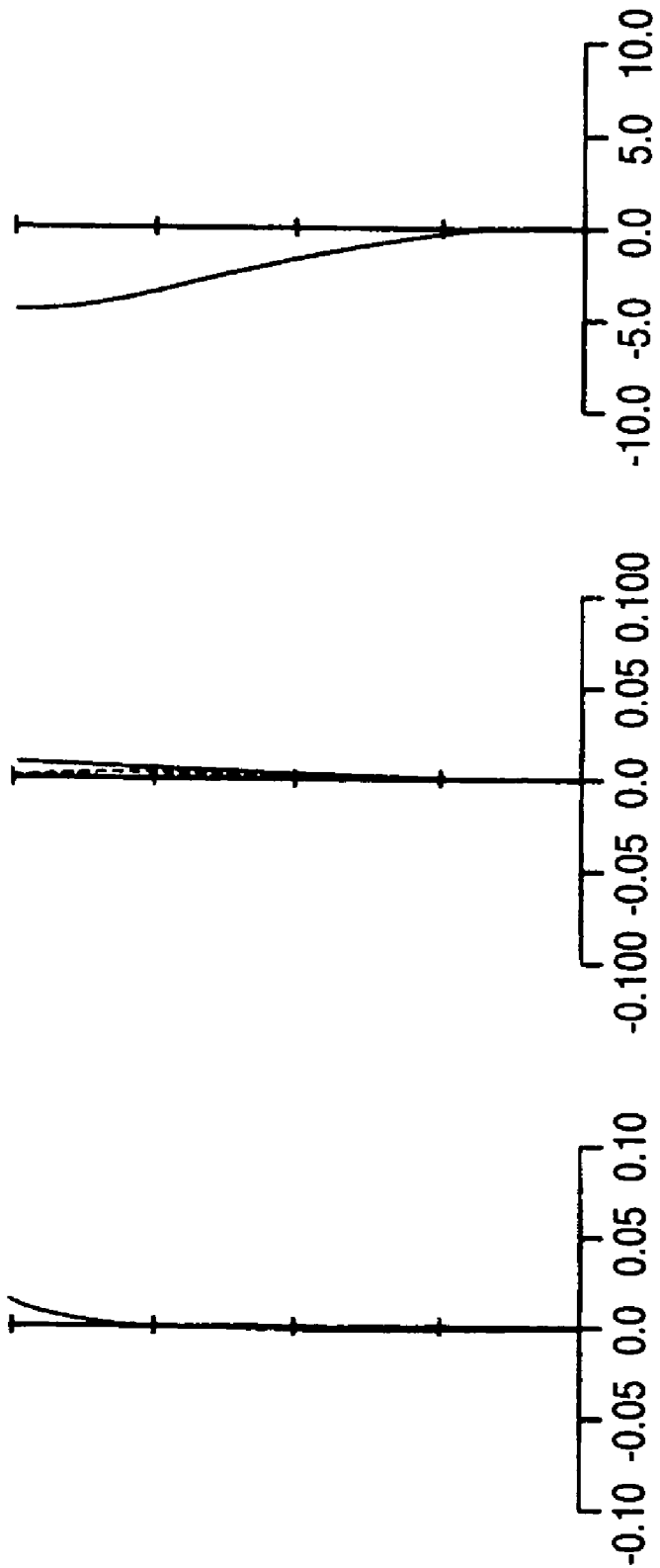

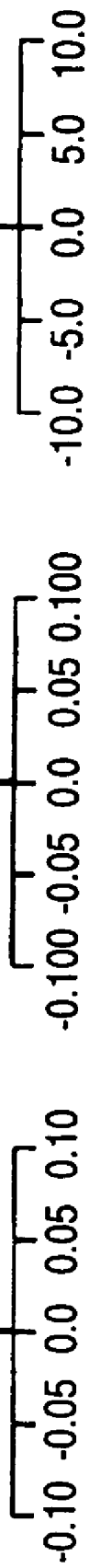

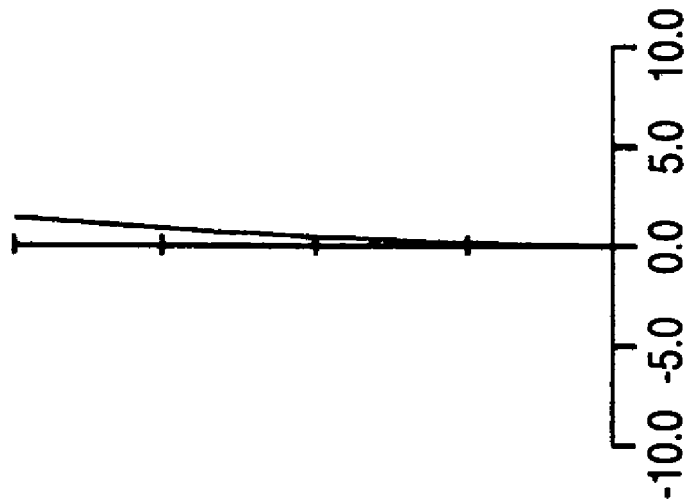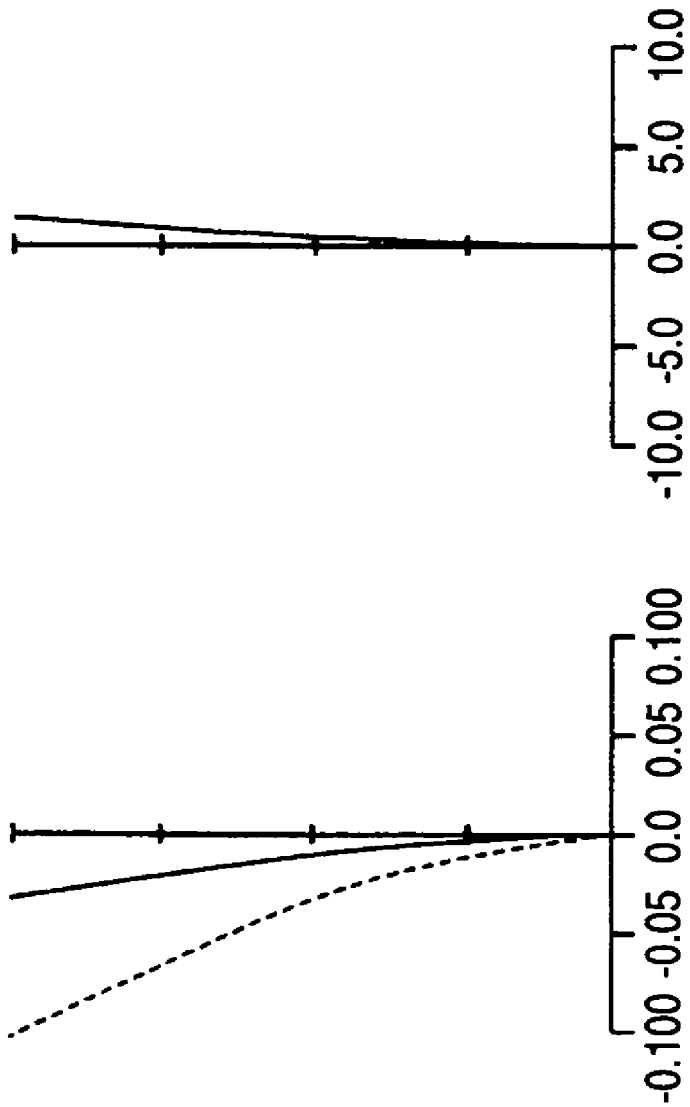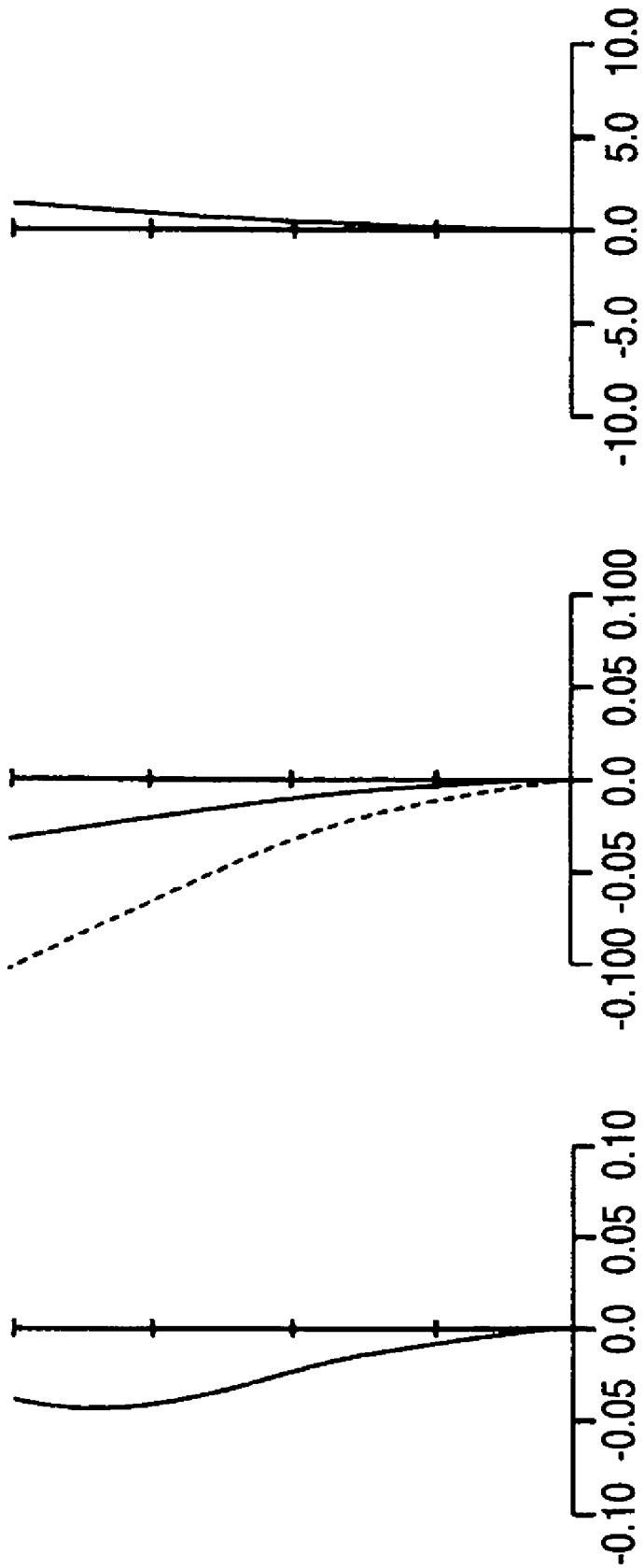

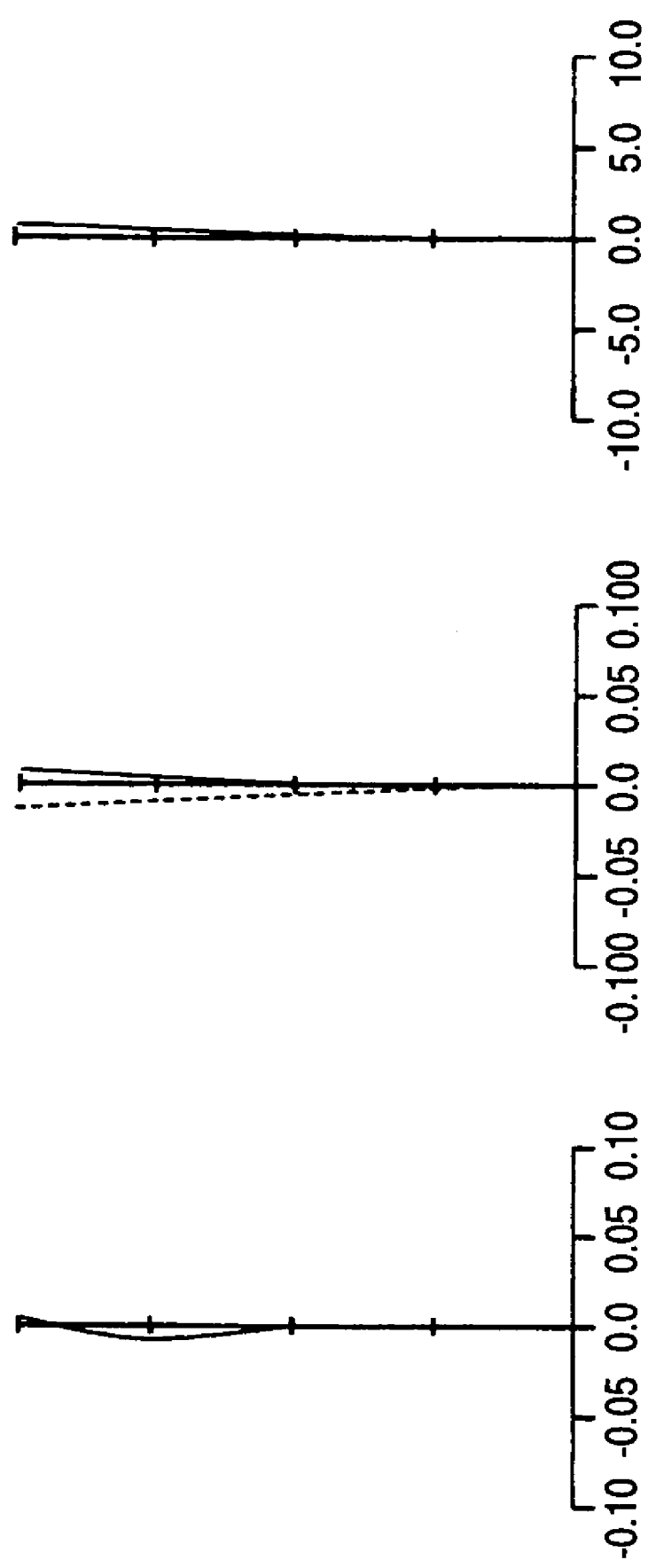

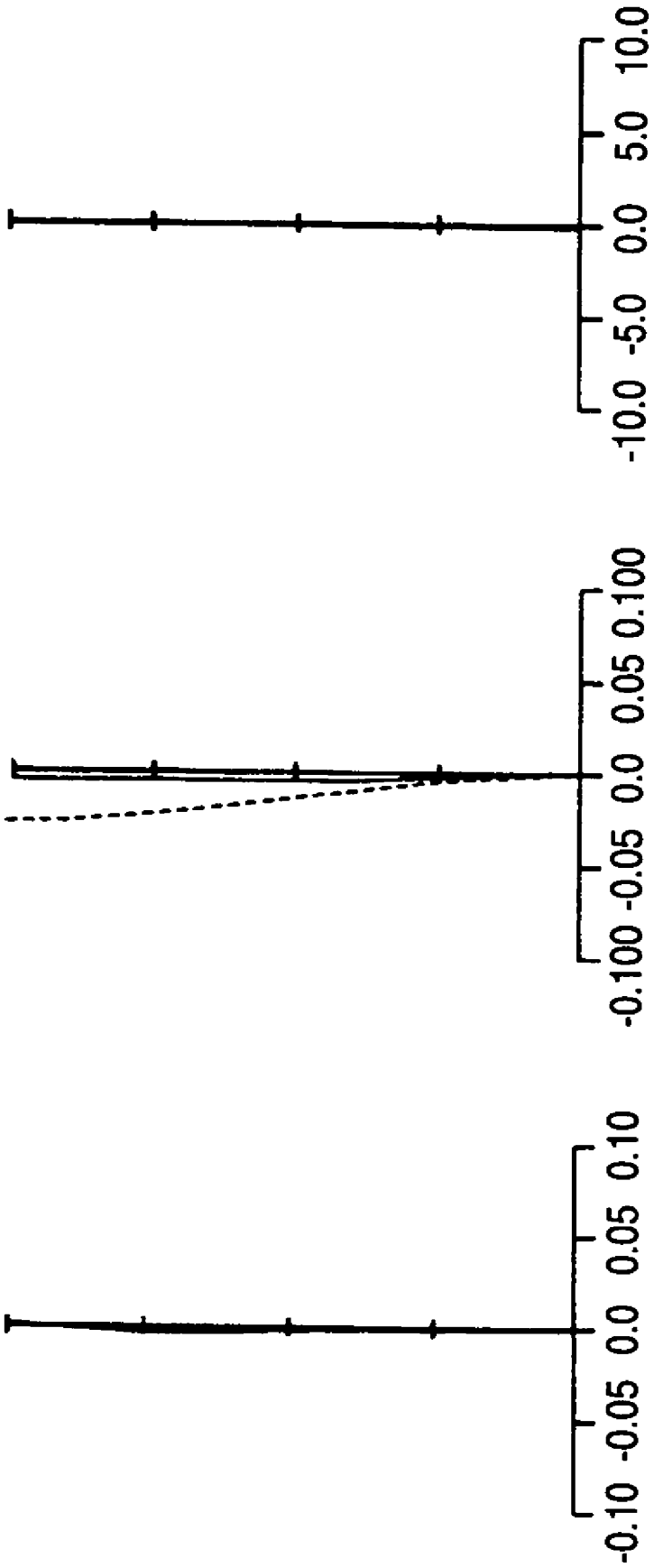

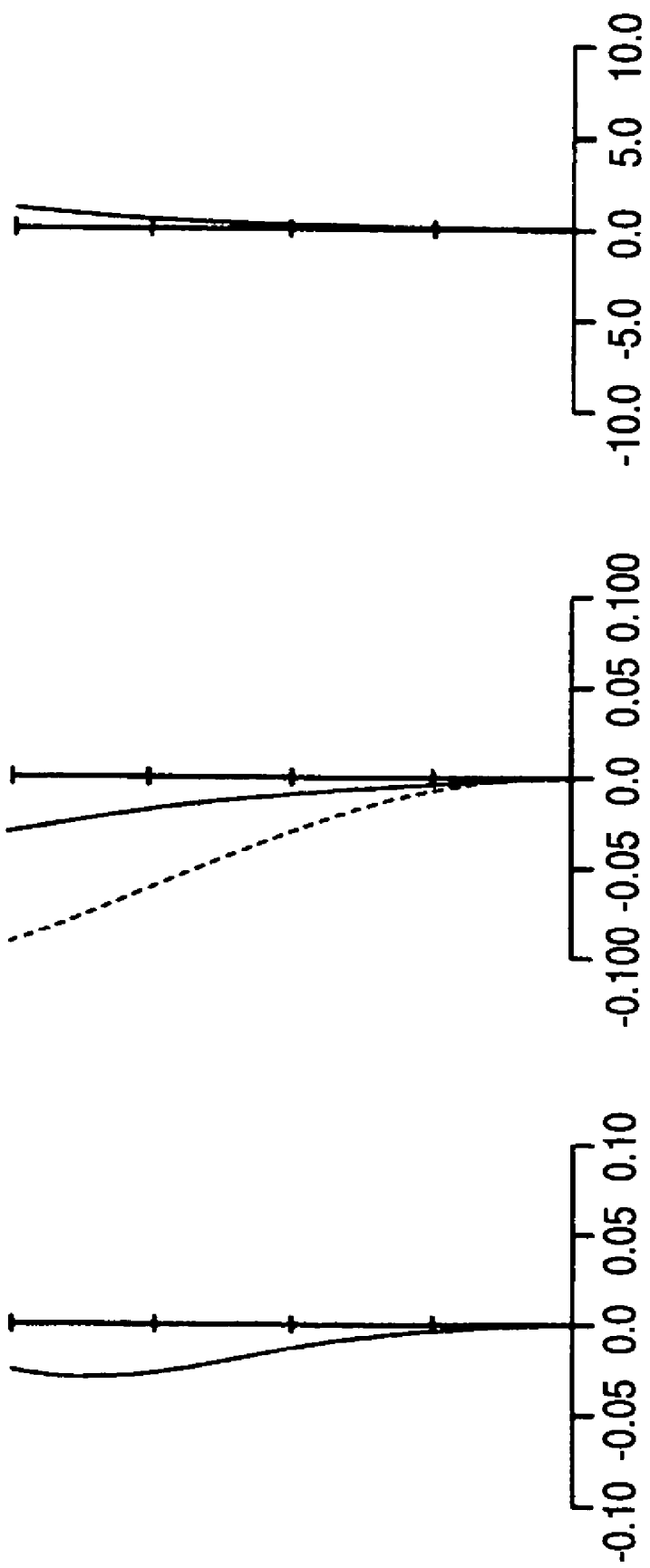
FIG. 12A  SPHERICAL ABERRATION  Fno = 3.63
FIG. 12B  ASTIGMATISM  ω = 1.15°
FIG. 12C  DISTORTION (%)  ω = 1.15°

ZOOM LENS AND IMAGE PICKUP DEVICE

CROSS REFERENCES TO RELATED APPLICATIONS

The present invention contains subject matter related to Japanese Patent Application JP 2005-241460 filed in the Japanese Patent Office on Aug. 23, 2005 the entire contents of which are incorporated herein by reference.

BACKGROUND OF THE INVENTION

1. Field of the Invention

The present invention relates to a novel zoom lens and to an image pickup device using this zoom lens. More particularly, the invention relates to a technique for realizing a high zoom ratio with a few number of lens elements.

2. Description of the Related Art

From the past, a zoom lens has been often used as a lens system for an image pickup device using solid-state imaging elements such as a video camera.

For example, zoom lenses described, for example, in patent references 1, 2, and 3 are available.

[Patent reference 1] JP-A-3-33710
[Patent reference 2] JP-A-8-5913
[Patent reference 3] JP-A-9-304699

SUMMARY OF THE INVENTION

In order to reduce the size of the lens system of an image pickup device using solid-state imaging elements such as a video camera and to curtail the cost, it is necessary to reduce the number of lens elements constituting the lens system. Furthermore, as a recent trend, there is a demand for a lens system having a high zoom ratio.

However, the zoom lens described in the above-cited patent reference 1 has lens elements whose number is 10 or less but the zoom ratio is only 10× or less.

The zoom lens described in the above-cited patent reference 2 has a zoom ratio of 20× but the lens system is composed of as many as 13 to 15 lens elements. Miniaturization and cost reduction have been achieved insufficiently.

Furthermore, the zoom lens described in the above-cited patent reference 3 has a lens system made up of 10 or less lens elements but the zoom ratio is only about 20×.

In view of the foregoing circumstances, it is desirable to provide a zoom lens which is made up of 10 or less lens elements, has a zoom ratio of more than 20×, and has excellent optical performance.

According to an aspect of the present invention, there is provided a zoom lens which includes 10 or less lens elements but shows a zoom ratio of more than 20×. The zoom lens has first, second, third, and fourth groups of lens elements placed in turn from the object side to the image side. The first group of lens elements has positive refractive power and is fixed in position during zooming. The second group of lens elements has negative refractive power and is moved in position during zooming. The third group of lens elements has positive refractive power, includes at least one aspheric surface, and is fixed in position during zooming. The fourth group of lens elements has positive refractive power, includes at least one aspheric surface, corrects variations in image surface position during zooming, and performs focusing. Let dz be the movable distance of the second group of lens elements to perform zooming. Let fw be the focal distance of the whole lens system at the wide angle end. The zoom lens satisfies the following conditional expression (1):

$$7.8 < \frac{dz}{fw} < 8.8 \quad (1)$$

Accordingly, the zoom lens according to the aspect of the present invention can be manufactured economically and compactly with a small number of lens elements of ten or less though it has a high zoom ratio exceeding 20×. Furthermore, a high-performance zoom lens having a suppressed curvature of field can be offered.

An image pickup device according to another aspect of the present invention has a zoom lens with a zoom ratio in excess of 20× and an image pickup unit converting an image formed by the zoom lens into an electrical signal. The zoom lens is made up of 10 or less lens elements. The zoom lens has first, second, third, and fourth groups of lens elements placed in turn from the object side to the image side. The first group of lens elements has positive refractive power and is fixed in position during zooming. The second group of lens elements has negative refractive power and is moved in position during zooming. The third group of lens elements has positive refractive power, includes at least one aspheric surface, and is fixed in position during zooming. The fourth group of lens elements has positive refractive power, includes at least one aspheric surface, corrects variations in image surface position during zooming, and performs focusing. Let dz be the movable distance of the second group of lens elements to perform zooming. Let fw be the focal distance of the whole lens system at the wide angle end. The zoom lens satisfies the following conditional expression (1):

$$7.8 < \frac{dz}{fw} < 8.8 \quad (1)$$

Accordingly, the image pickup device according to this aspect of the invention is small in size but can image scenes with a high zoom ratio exceeding 20×. In addition, high-quality images with a suppressed curvature of field can be obtained.

The zoom lens according to the aspect of the invention includes 10 or less lens elements but shows a zoom ratio of more than 20×. The zoom lens has first, second, third, and fourth groups of lens elements placed in turn from the object side to the image side. The first group of lens elements has positive refractive power and is fixed in position during zooming. The second group of lens elements has negative refractive power and is moved in position during zooming. The third group of lens elements has positive refractive power, includes at least one aspheric surface, and is fixed in position during zooming. The fourth group of lens elements has positive refractive power, includes at least one aspheric surface, corrects variations in image surface position during zooming, and performs focusing. The zoom lens satisfies the following conditional expression (1):

$$7.8 < \frac{dz}{fw} < 8.8 \quad (1)$$

where dz is the movable distance of the second group of lens elements to perform zooming and fw is the focal distance of the whole lens system at the wide angle end.

Accordingly, the zoom lens according to this aspect of the invention can be manufactured economically and compactly with a small number of lens elements of 10 or less though the lens has a high zoom ratio exceeding 20×. Furthermore, a high-performance zoom lens with a suppressed curvature of field can be offered.

The image pickup device according to the aspect of the invention has a zoom lens with a zoom ratio in excess of 20× and an image pickup unit converting an image formed by the zoom lens into an electrical signal. The zoom lens is made up of 10 or less lens elements. The zoom lens has first, second, third, and fourth groups of lens elements placed in turn from the object side to the image side. The first group of lens elements has a positive refractive power and is fixed in position during zooming. The second group of lens elements has negative refractive power and is moved in position during zooming. The third group of lens elements has positive refractive power, includes at least one aspheric surface, and is fixed in position during zooming. The fourth group of lens elements has positive refractive power, includes at least one aspheric surface, corrects variations in image surface position during zooming, and performs focusing. The zoom lens satisfies the following conditional expression (1):

$$7.8 < \frac{dz}{fw} < 8.8 \quad (1)$$

where dz is the movable distance of the second group of lens elements to perform zooming and fw is the focal distance of the whole lens system at the wide angle end.

Accordingly, the image pickup device according to the aspect of the present invention is small in size but can image scenes with a high zoom ratio exceeding 20×. In addition, high-quality images with a suppressed curvature of field can be obtained.

According to embodiments of the present invention, the zoom lens satisfies conditional expressions:

$$2.0 < \frac{f1}{fa} < 2.3 \quad (2)$$

$$0.25 < \left|\frac{f2}{fa}\right| < 0.41 \quad (3)$$

$$0.58 < \frac{f3}{fa} < 3.25 \quad (4)$$

$$0.7 < \frac{f4}{fa} < 0.9 \quad (5)$$

where $fa = \sqrt{fw \cdot ft}$, in which ft is the focal distance of the whole lens system at the far end, and $f_i$ is the focal distance of the ith group of lens elements (i=1, 2, 3, 4). Therefore, the diameter of the front lens group can be reduced further. The total length can be reduced further. A normal amount of back focus can be secured. At the same time, aberrations such as spherical aberration can be corrected well. In addition, the aperture ratio can be increased.

According to an embodiment of the invention, the third group of lens elements includes a single lens element having an aspheric convex surface on the object side and an aspheric concave surface on the image side. The fourth group of lens elements is made up of a negative lens element and a positive lens element placed in turn from the object side to the image side. The surface of the positive lens element on the image side is aspheric. Consequently, the total length of the lens system can be reduced. Furthermore, the fourth group of lens elements can be reduced in size. Additionally, spherical aberration can be corrected. Further, curvature of field and distortion can be corrected.

According to an embodiment of the invention, the third group of lens elements is made of a single lens element having an aspheric convex surface on the object side and an aspheric concave surface on the image side. The fourth group of lens elements is made up of a negative lens element, a first positive lens element, and a second positive lens element placed in turn from the object side to the image side. At least one surface of the positive lens element on the image side is aspheric. Consequently, the total length of the lens system can be reduced. Furthermore, the fourth group of lens elements can be reduced in size. Additionally, spherical aberration can be corrected.

In an embodiment of the invention, the whole lens system includes nine lens elements and so further reduction in size can be accomplished.

In an embodiment of the invention, the whole lens system includes ten lens elements. Consequently, a reduction in size can be accomplished.

BRIEF DESCRIPTION OF THE DRAWINGS

FIG. 2 is a diagram illustrating various aberrations of example 1 of a set of numerical values obtained by applying specific numerical values to the first mode of practice, together with FIGS. 3 and 4, illustrating spherical aberration, astigmatism, and distortion at the wide angle end.

FIG. 3 is a diagram illustrating spherical aberration, astigmatism, and distortion at a standard focal distance.

FIG. 4 is a diagram illustrating spherical aberration, astigmatism, and distortion at the far end.

FIG. 7 is a diagram illustrating spherical aberration, astigmatism, and distortion at a standard focal distance.

FIG. 11 is a diagram illustrating spherical aberration, astigmatism, and distortion at a standard focal distance.

FIG. 12 is a diagram illustrating spherical aberration, astigmatism, and distortion at the far end.

DESCRIPTION OF THE PREFERRED EMBODIMENTS

Figure 1:
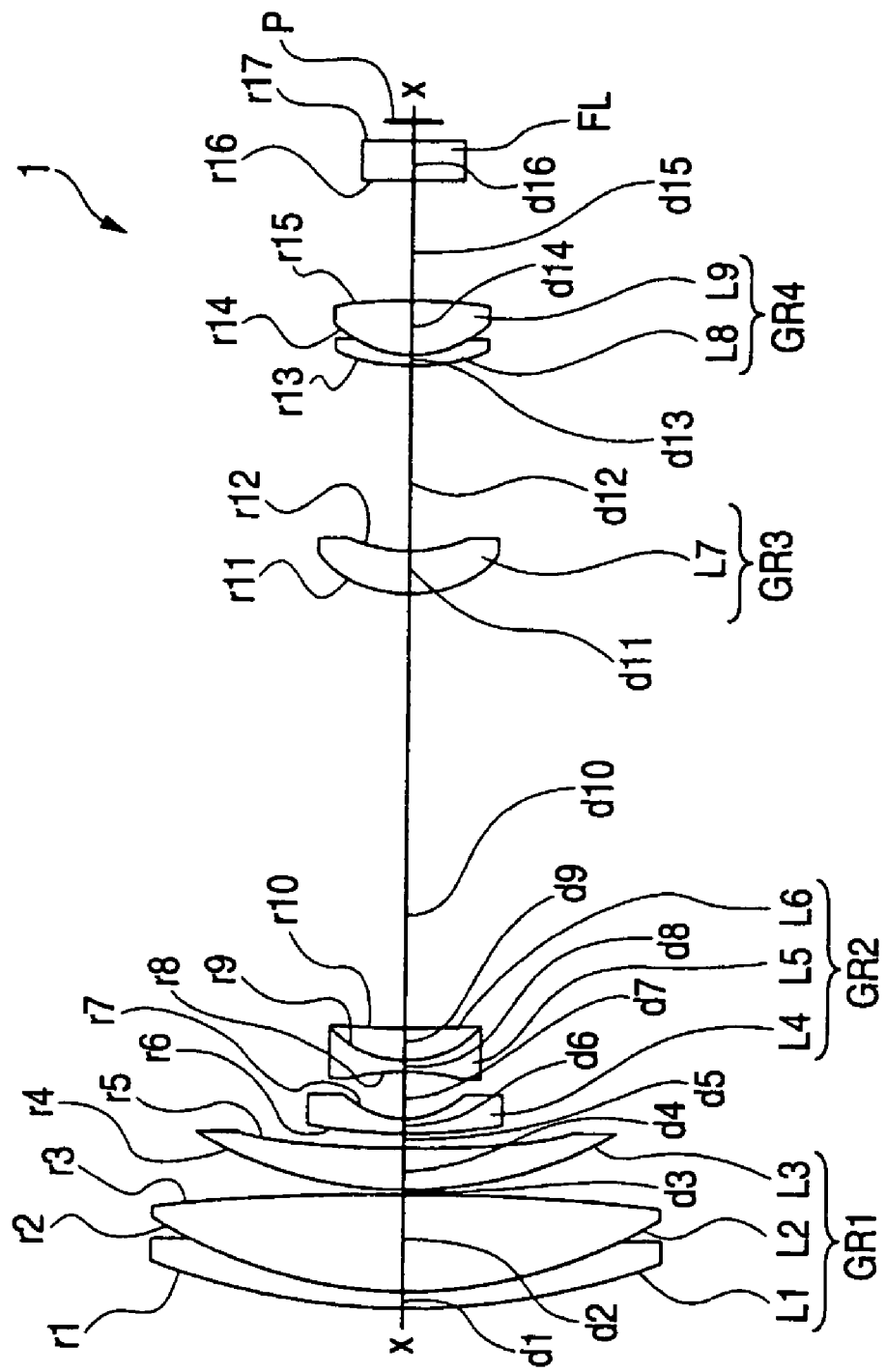
FIG. 1 is a diagram showing a lens configuration according to a first mode of practice of the zoom lens of the present invention.

The best mode for implementing a zoom lens and image pickup device of the present invention is hereinafter described with reference to the accompanying drawings.

A zoom lens according to an embodiment of the present invention is made up of ten or less lens elements, has a zoom ratio in excess of 20×, and has first, second, third, and fourth groups of lens elements placed in turn from the object side to the image side. The first group of lens elements has positive refractive power and is fixed in position during zooming. The second group of lens elements has negative refractive power and is moved position during zooming. The third group of lens elements has positive refractive power, includes at least one aspheric surface, and is fixed in position during zooming. The fourth group of lens elements has positive refractive power, includes at least one aspheric surface, corrects variations in the image surface position during zooming, and performs focusing. The zoom lens satisfies the following conditional expression (1):

$$7.8 < \frac{dz}{fw} < 8.8 \quad (1)$$

where dz is the movable distance of the second group of lens elements to perform zooming and fw is the focal distance of the whole lens system at the wide angle end.

The zoom lens according to the above-described embodiment of the invention has the configuration described above. Therefore, the lens is small in size but can achieve a zoom ratio exceeding 20×. If necessary, the lens can achieve a zoom ratio exceeding 30×. Furthermore, the lens has excellent optical performance.

The conditional expression (1) stipulates the relationship between the distance dz moved by the second group of lens elements when the zoom ratio is varied from the wide angle end to the far end and the focal distance fw of the whole lens system at the wide angle end.

In the conditional expression (1), if the value of dz/fw is lower than 7.8, it is necessary to increase the power of the second group of lens elements in order to obtain a zoom ratio of more than 30×. Concomitantly, the Petzval sum increases on the negative side, resulting in overcorrection. Conversely, if the value of dz/fw is in excess of 8.8, the total length of the zoom lens increases. Furthermore, it is difficult to move the second group of lens elements without producing eccentricity, thus giving rise to impractical results.

The zoom lens according to this embodiment of the invention preferably satisfies the following conditional expressions (2), (3), (4), and (5):

$$2.0 < \frac{f1}{fa} < 2.3 \quad (2)$$

$$0.25 < \left|\frac{f2}{fa}\right| < 0.41 \quad (3)$$

$$0.58 < \frac{f3}{fa} < 3.25 \quad (4)$$

$$0.7 < \frac{f4}{fa} < 0.9 \quad (5)$$

where $fa=\sqrt{fw \cdot ft}$, in which ft is the focal distance of the whole lens system at the far end, and $f_i$ is the focal distance of the ith group of lens elements (i=1, 2, 3, 4).

The conditional expressions (2) and (3) stipulate the relationships of the focal distances f1 and f2, respectively, of the first and second groups of lens elements to $fa=\sqrt{fw \cdot ft}$.

In the conditional expressions (2) and (3) if the value of f1/fa is lower than 2 or if the value of |f2/fa| exceeds 0.41, it would be necessary to move the second group of lens elements a great distance when the zoom ratio is varied from the wide angle end to the far end in order to secure a zoom ratio of 30× or more. This increases the diameter of the front lens group and the total length of the zoom lens with undesirable results. Conversely, if the value of f1/fa is in excess of 2.3 or the value of |f2/fa| is lower than 0.25, the Petzval sum increases on the negative side, resulting in overcorrection.

The conditional expression (4) stipulates the relationship between the focal distance f3 of the third group of lens elements and the fa.

In the conditional expression (4), if the value of f3/fa is lower than 0.58, it is difficult to correct spherical aberration. Conversely, if the value of f3/fa is in excess of 3.25, it is necessary to increase the lens diameter of the fourth group of lens elements. This is disadvantageous in increasing the aperture ratio.

The conditional expression (5) stipulates the relationship between the focal distance f4 of the fourth group of lens elements and the fa.

In the conditional expression (5), if the value of f4/fa is lower than 0.7, it is difficult to correct spherical aberration. Also, the back focus is shortened. Consequently, where the taking lens is used for an image pickup device using solid-state imaging elements such as a video camera, it is difficult to place an optical filter necessary for the taking lens. Conversely, if the value of f4/fa exceeds 0.9, it is necessary to move the fourth group of lens elements a greater distance. This increases the total length of the zoom lens with undesirable results.

Preferably, the third group of lens elements is made of a single positive meniscus lens having an object-side surface and an image-side surface. The object-side surface faces the object as a convex surface. The image-side surface faces the object as a convex surface. The two surfaces are aspheric. The fourth group of lens elements is made up of two lens elements, i.e., a negative lens element and a positive lens element, placed from the object side in turn. The surface of the positive lens element on the image side is aspheric. Especially, this configuration is preferred where the whole lens system is made up of nine lens elements.

If the third group of lens elements is made of a single lens element having a convex aspheric surface on the object side and a concave aspheric surface on the image side, the position of the principal point of the third group of lens elements can be brought closer to the object. Hence, the total length of the lens system can be shortened. Furthermore, the surface on the image side is concave and so the light rays emitted from the third group of lens elements are made lower in height. This makes it possible to reduce the size of the fourth group of lens elements. In addition, the aspherization increases the power of the third group of lens elements, which in turn makes it possible to correct spherical aberration. The fourth group of lens elements is made up of a negative lens element and a positive lens element which are placed in turn from object side to image side. The surface of the positive lens element on the image side is aspheric. Thus, curvature of field and distortion can be corrected. The negative lens element of the fourth group of lens elements is an aspheric lens element having a refractive index of more than 1.9. This lens element is generally difficult to manufacture. Generally, an aspheric convex surface can be formed more easily than an aspheric non-convex surface. Consequently, the cost can be reduced by aspherisizing the convex lens on the image side.

The third and fourth groups of lens elements are designed as described previously. Moreover, they can also be constructed as described below. The third group of lens elements is made of a single positive meniscus lens having an object-side surface and an image-side surface. The object-side surface faces the object as a convex surface, and the image-side surface faces the object as a convex surface. The two surfaces are aspheric. The fourth group of lens elements is made up of three lens elements, i.e., a negative lens element, a first positive lens element, and a second positive lens element, placed in turn from the object side. At least one surface of the second positive lens element located on the image side is preferably aspheric. Especially preferably, the whole lens system is made up of ten lens elements.

If the third group of lens elements is made of a single lens element having a convex, aspheric surface on the object side and a concave aspheric surface on the image side, the position of the principal point of the third group of lens elements can be brought closer to the object. Hence, the total length of the lens system can be reduced. Furthermore, since the surface on the image side is concave, light rays emitted from the third group of lens elements can be lowered in height. The fourth group of lens elements can be reduced in size. In addition, the aspherization increases the power of the third group of lens elements. This makes it possible to correct spherical aberration. The fourth group of lens elements is made up of a negative lens element, a first positive lens element, and a second positive lens element placed in turn from object side to image side. At least one surface of the second positive lens element on the image side is aspheric. Consequently, curvature of field and distortion can be corrected. Since the second positive lens element on the image side has the effect of asphericality, a low-dispersion glass having an Abbe number of greater than 75, which is generally difficult to manufacture as an aspheric surface, can be used as a spheric lens for the first positive lens element located between the negative lens element and the second positive lens element. Chromatic aberration that tends to be produced in high-magnification zoom lenses can be reduced.

Modes of practice of a zoom lens according to an embodiment of the present invention and examples of numerical values obtained by applying specific numerical values to the modes of practice are hereinafter described.

Figure 5:
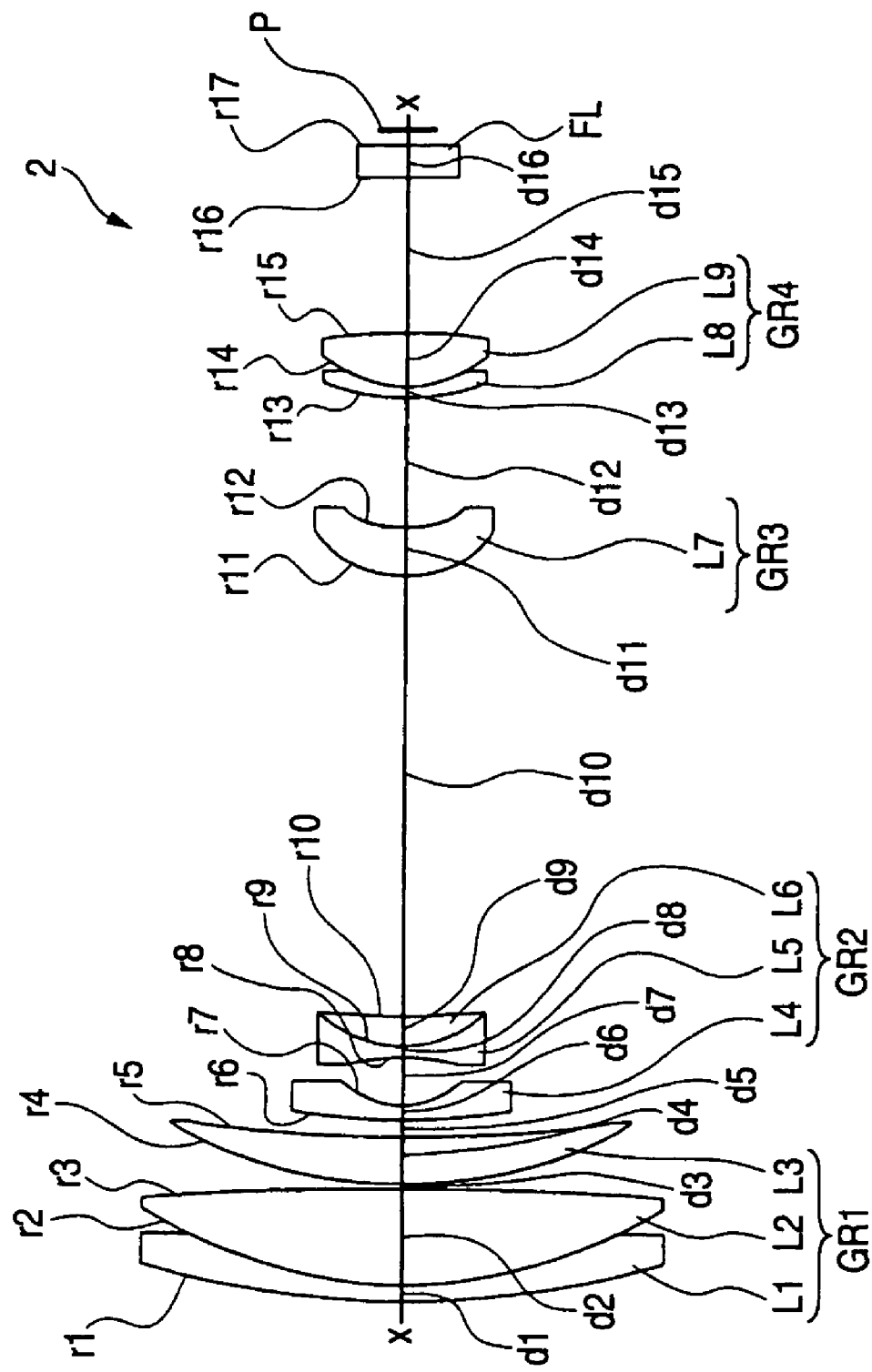
FIG. 5 is a diagram showing a lens configuration according to a second mode of practice of the zoom lens of the present invention.
Figure 9:
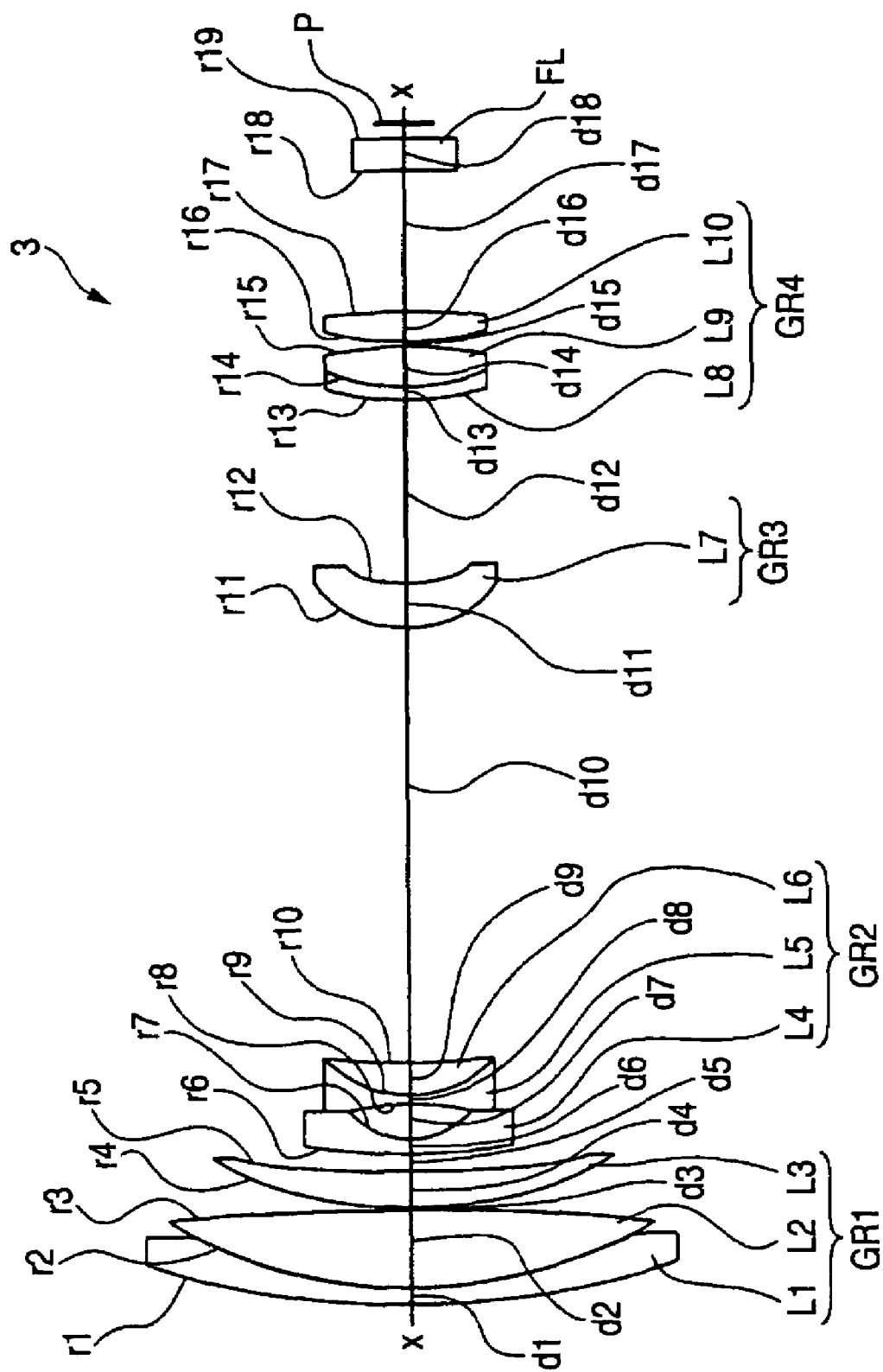
FIG. 9 is a diagram showing a lens configuration according to a third mode of practice of the zoom lens of the present invention.

A zoom lens 1 associated with a first mode of practice shown in FIG. 1, a zoom lens 2 associated with a second mode of practice shown in FIG. 5, and a zoom lens 3 associated with a third mode of practice shown in FIG. 9 are all so-called rear-focus zoom lenses each having four groups of nine lens elements or four groups of ten lens elements. That is, the four groups are made up of a first group of lens elements GR1, a second group of lens elements GR2, a third group of lens elements GR3, and a fourth group of lens elements GR4 placed in turn from the object side. The first group of lens elements GR1 has positive refractive power and is fixed in position during zooming. The second group of lens elements GR2 has negative refractive power and is moved in position during zooming. The third group of lens elements GR3 has positive refractive power, includes at least one aspheric surface, and is fixed in position during zooming. The fourth group of lens elements GR4 has positive refractive power, includes at least one aspheric surface, corrects variations in the position of the image plane during zooming, and performs focusing. A low-pass filter FL is located between the fourth group of lens elements GR4 and the image surface P.

The first group of lens elements GR1 is made up of three lens elements placed in turn from the object side, i.e., L1, L2, and L3. The first group of lens elements GR1 exhibits positive refractive power as a whole and is fixed in position during zooming. The second group of lens elements GR2 is made up of three lens elements placed in turn from the object side, i.e., L4, L5, and L6. The second group of lens elements GR2 exhibits negative refractive power as a whole and is moved in position along the optical axis during zooming. The third group of lens elements GR3 is made of a single lens element L7 having positive refractive power. The position of the element L7 is fixed in position during zooming. In the first and second modes of practice, the fourth group of lens elements GR4 is made up of two lens elements placed in turn from the object side, i.e., L8 and L9. In the third mode of practice, the fourth group of lens elements GR4 is made up of three lens elements placed in turn from the object side, i.e., L8, L9, and L10. The fourth group of lens elements GR4 exhibits positive refractive power as a whole. During zooming, the second group of lens elements GR2 is moved. At this time, the fourth group of lens elements GR4 moves along the optical axis to correct the image surface position and performs focusing.

In each of the zoom lenses 1, 2, and 3, zooming is performed by moving the second group of lens elements GR2 along the optical axis toward the first group of lens elements GR1 or toward the third group of lens elements GR3 between the first group of lens elements GR1 and the third group of lens elements GR3 which are fixed in the direction of the optical axis. Accordingly, the zooming varies the space d5 between the lens surface r5 of the lens element L3 of the first group of lens elements GR1 on the side of the image surface P and the lens surface r6 of the lens element L4 of the second group of lens elements GR2 on the object side and the space d10 between the lens surface r10 of the lens element L6 of the second group of lens elements GR2 on the side of the image surface P and the lens surface r11 of the lens element L7 of the third group of lens elements GR3 on the object side as shown in FIGS. 1, 5, and 9.

To correct variations in the image surface position caused by the zooming and to perform focusing, the fourth group of lens elements GR4 moves between the third group of lens elements GR3 and the low-pass filter FL in the direction of the optical axis toward the third group of lens elements GR3 or toward the low-pass filter FL. Accordingly, as the fourth group of lens elements GR4 moves, the space d12 between the lens surface r12 of the lens element L7 of the third group of lens elements GR3 on the side of the image surface P and the lens surface r13 of the lens element L8 of the fourth group of lens elements GR4 on the object side and the space d15 (in the case of the zoom lenses 1 and 2) between the lens surface r15 of the lens element L9 of the fourth group of lens elements GR4 on the side of the image surface P and the surface r16 of the low-pass filter FL on the object side or the space d17 (in the case of the zoom lens 3) between the lens surface r17 of the lens L10 on the side of the image plane P and the surface r18 of the low-pass filter FL on the object side.

In the zoom lenses 1, 2, and 3, the lens element L7 constituting the third group of lens elements GR3 is a positive meniscus lens having a surface r11 on the object side and a surface r12 on the image side. The surface r11 faces the object as a convex surface, and the surface r12 faces the object as a convex surface. The surfaces r11 and r12 are made of aspheric surfaces. In the zoom lenses 1 and 2, two lens elements L8 and L9 forming the fourth group of lens elements GR4 are a negative lens element and a positive lens element, respectively. The surface r15 of the positive lens element L9 on the image side P is aspheric. In the zoom lens 3, three lens elements L8, L9, and L10 forming the fourth group of lens elements GR4 are a negative lens element, a positive lens element, and a positive lens element, respectively. Both surfaces r16 and r17 of the positive lens element L10 are aspheric.

Lens data in examples 1, 2, and 3 of numerical examples obtained by applying specific numerical values to the zoom lenses 1, 2, and 3 are hereinafter described by referring to tables and figures.

In the following tables, "ri" indicates the curvature of radius of the ith lens surface when counted from the object side. "di" indicates the space between the ith surface when counted from the object side and the (i+1)th surface on the optical axis (x-x). "ni" indicates the refractive index of the ith surface when counted from the object side for d-rays having a wavelength of 587.6 nm. "vi" indicates the Abbe number of the ith surface when counted from the object side for the d-rays. "f" indicates the focal distance of the whole lens system. "Fno" indicates a full aperture F value. "ω" indicates a half angle of view. "Infinity" indicates that the surface is a flat plane. "Variable" indicates that the space between the surfaces is variable.

Each of the zoom lenses 1, 2, and 3 can include aspheric lens surfaces. Aspheric shapes are defined by the following Eq. (1).

$$Z = \frac{(1/R)H^2}{1+\sqrt{1-(1+K)(1/R)^2 H^2}} + A_4 H^4 + A_6 H^6 + A_8 H^8 + A_{10} H^{10} \quad (1)$$

where Z is the distance in the direction of the optical axis when the height H of the contact plane at an aspheric vertex of an aspheric surface and a spherical surface from the optical axis x-x is $\sqrt{X^2+Y^2}$, 1/R is the curvature of the aspheric vertex, K is the conic constant, and $A_{2i}$ is the aspheric coefficient of the 2ith order.

Table 1 shows the values of various dimensions of example 1 of a set of numerical values obtained by applying specific numerical values to the zoom lens 1.

TABLE 1

| i | ri | di | ni | vi |
|---|---|---|---|---|
| 1 | 14.454 | 0.34 | 1.92286 | 20.9 |
| 2 | 9.163 | 2.00 | 1.48749 | 70.4 |
| 3 | −60.498 | 0.10 | | |
| 4 | 8.310 | 0.90 | 1.77250 | 49.6 |
| 5 | 22.402 | variable | | |
| 6 | 27.015 | 0.22 | 1.90366 | 31.3 |
| 7 | 1.819 | 1.02 | | |
| 8 | −7.568 | 0.22 | 1.67270 | 32.2 |
| 9 | 2.007 | 0.66 | 1.94610 | 18.0 |
| 10 | 9.099 | variable | | |
| 11 | 2.610 | 0.93 | 1.52470 | 56.2 |
| 12 | 4.774 | variable | | |
| 13 | 3.554 | 0.25 | 1.94610 | 18.0 |
| 14 | 2.247 | 1.08 | 1.69350 | 53.2 |
| 15 | −9.755 | variable | | |
| 16 | infinity | 0.79 | 1.51680 | 64.2 |
| 17 | infinity | | | |

As described previously, in the zoom lens 1, when zooming or focusing is done, the spaces d5, d10, d12, and d15 between the surfaces vary. When zooming is done from the wide angle end to the far end and the focal distance f (magnification) is varied to 1.00, 5.55, and 30.78, the values of d5, d10, d12, and d15 obtained in example 1 of numerical values are shown in Table 2.

TABLE 2

| | f | | |
|---|---|---|---|
| | 1.00 | 5.55 | 30.78 |
| d5 | 0.40 | 6.20 | 8.69 |
| d10 | 9.15 | 3.34 | 0.86 |
| d12 | 3.90 | 2.63 | 5.12 |
| d15 | 2.59 | 3.86 | 1.37 |

As described previously, the surfaces r11, r12, and r15 of the zoom lens 1 are made of aspheric surfaces. Aspheric coefficients A4, A6, A8, and A10 of the fourth order, sixth order, eighth order, and tenth order, respectively, of the r11, r12, and r15 in example 1 of a set of numerical values are shown in Table 3. Note that in Table 3 and other tables given below indicating aspheric coefficients, "E-i" indicates an exponential expression with a base of 10, i.e., $10^{-i}$. For example, "0.12345E-05" indicates "$0.12345 \times 10^{-5}$".

TABLE 3

| | A4 | A6 | A8 | A10 |
|---|---|---|---|---|
| r11 | 0.8663e−02 | −.3335e−02 | 0.2451e−02 | −.31200e−03 |
| r12 | 0.2154e−01 | −.4421e−02 | 0.4609e−02 | −.5116e−03 |
| r15 | 0.3182e−02 | 0.1217e−03 | −.1118e−03 | 0.2576e−07 |

The values of dz/fw, f1/fa, |f2/fa|, f3/fa, and f4/fa corresponding to f, Fno, 2ω and the conditional expressions (1), (2), (3), (4), and (5) in example 1 of a set of numerical values are shown in Table 4.

TABLE 4

| f | 1.00 to 30.78 |
|---|---|
| Fno | 1.81 to 3.94 |
| 2ω | 30.52 to 1.03 |
| dz/fw | 8.29 |
| f1/fa | 2.17 |
| |f2/fa| | 0.32 |
| f3/fa | 1.72 |
| f4/fa | 0.82 |

FIGS. 2 to 4 show aberration diagrams of spherical aberrations, astigmatisms, and distortions at the wide angle end, standard focal distance, and far end in example 1 of a set of numerical values for d-rays having a wavelength of 587.6 nm. In the astigmatism aberration diagram, each solid line indicates values on a sagittal image surface, and each broken line indicates values on a meridional image surface. FIGS. 6-8 and FIGS. 10-12 given below show similar values.

Table 5 shows values of various dimensions of example of a set of numerical values obtained by applying specific numerical values to the zoom lens 2.

TABLE 5

| i | ri | di | ni | vi |
|---|---|---|---|---|
| 1 | 16.711 | 0.34 | 1.92286 | 20.9 |
| 2 | 8.887 | 2.00 | 1.48749 | 70.4 |
| 3 | −76.302 | 0.10 | | |
| 4 | 8.671 | 1.04 | 1.88300 | 40.8 |
| 5 | 28.740 | variable | | |
| 6 | 16.887 | 0.22 | 1.90366 | 31.3 |

TABLE 5-continued

| i | ri | di | ni | vi |
|---|------|----------|---------|------|
| 7 | 1.722 | 1.02 | | |
| 8 | −5.641 | 0.22 | 1.62004 | 36.3 |
| 9 | 2.118 | 0.66 | 1.94610 | 18.0 |
| 10 | 9.191 | variable | | |
| 11 | 2.064 | 0.93 | 1.52470 | 56.2 |
| 12 | 2.629 | variable | | |
| 13 | 3.730 | 0.25 | 1.94610 | 18.0 |
| 14 | 2.294 | 1.08 | 1.69350 | 53.2 |
| 15 | −7.812 | variable | | |
| 16 | infinity | 0.66 | 1.51680 | 64.2 |
| 17 | infinity | | | |

As described previously, in the zoom lens 2, when zooming or focusing is done, the spaces d5, d10, d12, and d15 between the surfaces vary. When zooming is performed from wide angle end to far end and the focal distance f (magnification) is varied to 1.00, 5.55, and 30.82, the values of d5, d10, d12, and d15 obtained in example 2 of a set of numerical values are shown in Table 6.

TABLE 6

| | f | | |
|---|------|------|------|
| | 1.00 | 5.55 | 30.82 |
| d5 | 0.40 | 5.89 | 8.70 |
| d10 | 9.15 | 3.66 | 0.84 |
| d12 | 2.72 | 1.23 | 4.14 |
| d15 | 3.21 | 4.69 | 1.78 |

As described previously, in the zoom lens 2, the surfaces r11, r12, and r15 are made of aspheric surfaces. Aspheric coefficients A4, A6, A8, and A10 of the fourth order, sixth order, eighth order, and tenth order, respectively, of the r11, r12, and r15 in example 2 of a set of numerical values are shown in Table 7.

TABLE 7

| | A4 | A6 | A8 | A10 |
|---|---|---|---|---|
| r11 | 0.5553e−02 | −.3031e−02 | 0.1237e−02 | −.1158e−03 |
| r12 | 0.2494e−01 | −.1372e−02 | 0.1845e−02 | 0.6122e−03 |
| r15 | 0.2792e−02 | −.3511e−03 | 0.4318e−03 | −.1512e−03 |

The values of dz/fw, f1/fa, |f2/fa|, f3/fa, and f4/fa corresponding to f, Fno, 2ω and the conditional expressions (1), (2), (3), (4), and (5) in example 2 of a set of numerical values are shown in Table 8.

TABLE 8

| f | 1.00 to 30.82 |
|---|---|
| Fno | 1.82 to 3.76 |
| 2ω | 33.15 to 1.14 |
| dz/fw | 8.30 |
| f1/fa | 2.13 |
| |f2/fa| | 0.32 |
| f3/fa | 2.11 |
| f4/fa | 0.80 |

Figures 6A, 6B, 6C:
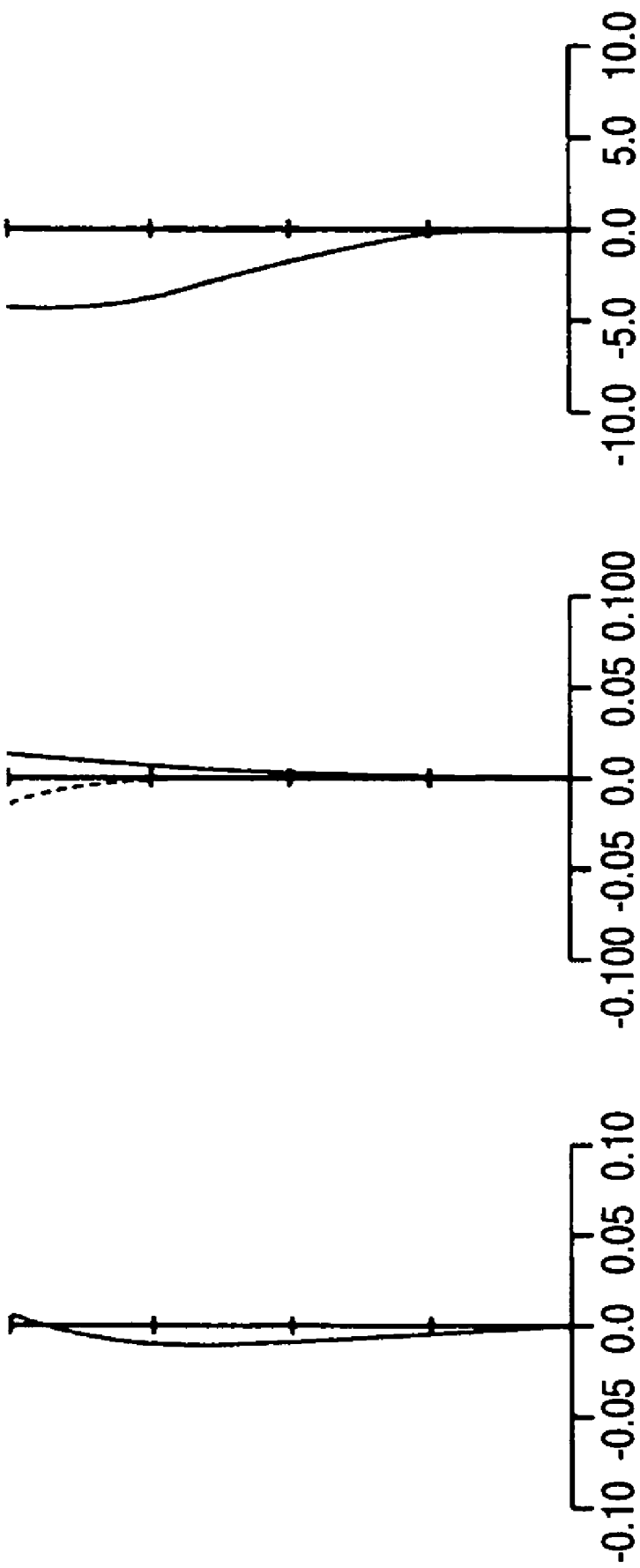
FIG. 6 is a diagram illustrating various aberrations of example 2 of a set of numerical values obtained by applying specific numerical values to the second mode of practice, together with FIGS. 7 and 8, illustrating spherical aberration, astigmatism, and distortion at the wide angle end.
Figure 8A:
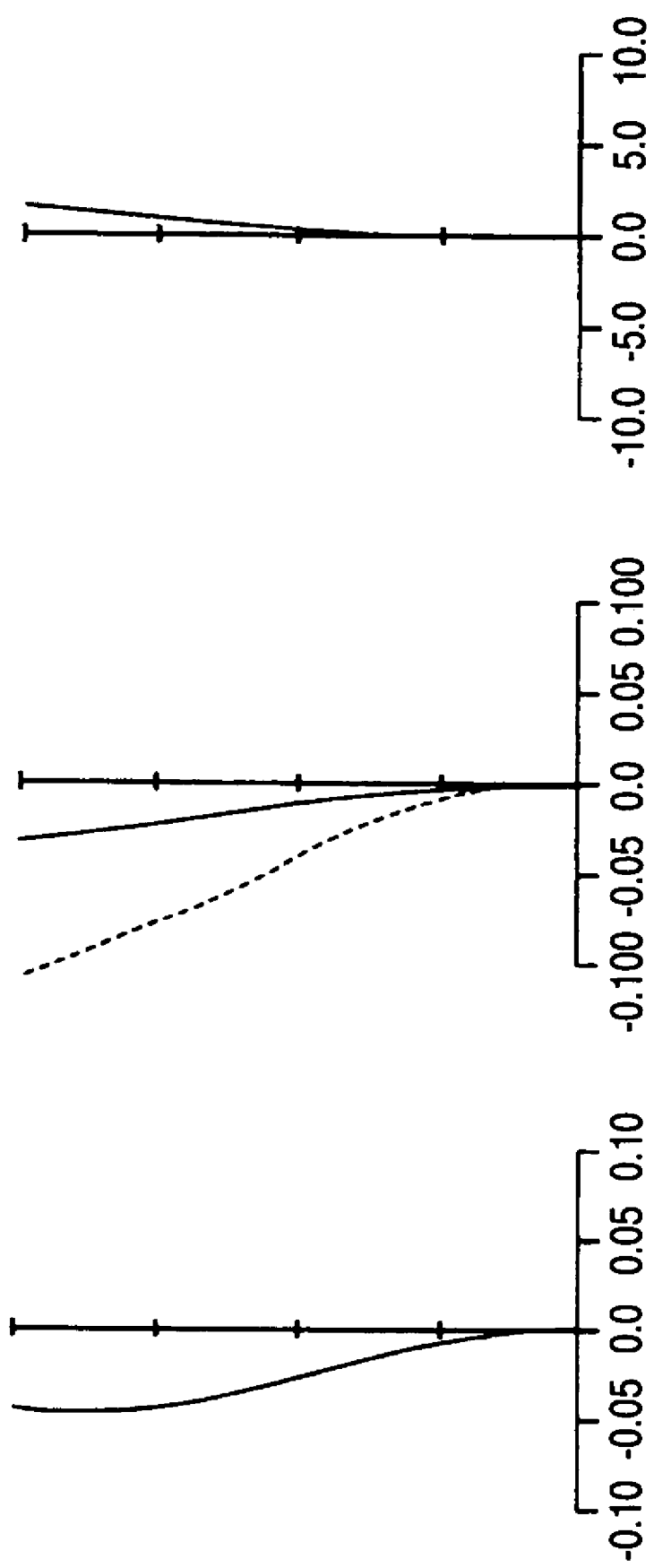
FIG. 8 is a diagram illustrating spherical aberration, astigmatism, and distortion at the far end.
Figure 8B:
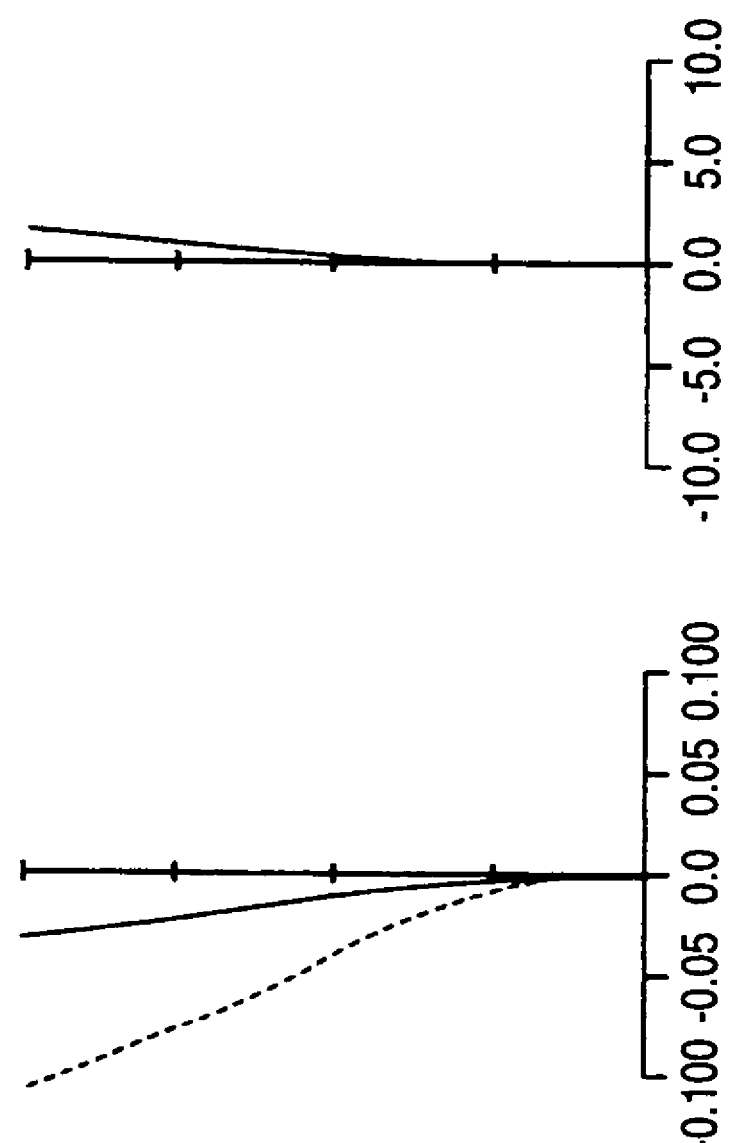
Figure 8C:
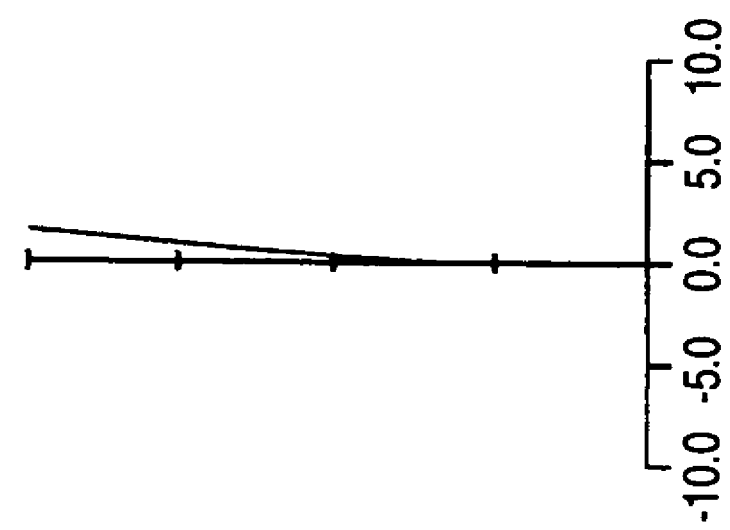

FIGS. 6 to 8 show aberration diagrams of spherical aberrations, astigmatisms, and distortions at the wide angle end, standard focal distance, and far end of the zoom lens 2.

Table 9 shows values of various dimensions of example 3 of a set of numerical values obtained by applying specific numerical values to the zoom lens 3.

TABLE 9

| i | ri | di | ni | vi |
|---|------|----------|---------|------|
| 1 | 16.863 | 0.33 | 1.92286 | 20.9 |
| 2 | 9.546 | 1.66 | 1.49700 | 81.6 |
| 3 | −53.022 | 0.04 | | |
| 4 | 8.390 | 0.74 | 1.88300 | 40.8 |
| 5 | 21.622 | variable | | |
| 6 | 15.107 | 0.27 | 1.92286 | 20.9 |
| 7 | 1.655 | 0.78 | | |
| 8 | −4.689 | 0.21 | 1.58913 | 61.3 |
| 9 | 2.131 | 0.70 | 1.94610 | 18.0 |
| 10 | 13.898 | variable | | |
| 11 | 2.733 | 0.92 | 1.58313 | 59.4 |
| 12 | 4.464 | variable | | |
| 13 | 8.667 | 0.25 | 1.94610 | 18.0 |
| 14 | 3.938 | 0.83 | 1.49700 | 81.6 |
| 15 | −8.323 | 0.08 | | |
| 16 | 4.770 | 0.62 | 1.69350 | 53.2 |
| 17 | −23.652 | variable | | |
| 18 | infinity | 0.66 | 1.51680 | 64.2 |
| 19 | infinity | | | |

As described previously, in the zoom lens 3, when zooming or focusing is done, the spaces d5, d10, d12, and d17 between the spaces vary. When zooming is performed from the wide angle end to the far end and the focal distance f (magnification) is varied to 1.00, 5.55, and 30.63, the values of d5, d10, and d12, and d17 obtained in example 3 of a set of numerical values are shown in Table 10.

TABLE 10

| | f | | |
|---|------|------|------|
| | 1.00 | 5.53 | 30.63 |
| d5 | 0.42 | 6.36 | 8.75 |
| d10 | 9.27 | 3.32 | 0.94 |
| d12 | 3.89 | 2.74 | 5.24 |
| d17 | 2.96 | 4.12 | 1.61 |

As described previously, in the zoom lens 3, the surfaces r11, r12, r16, and r17 are made of aspheric surfaces. Aspheric coefficients A4, A6, A8, and A10 of the fourth order, sixth order, eighth order, and tenth order, respectively, of the r11, r12, r16, and r17 in example 3 of a set of numerical values are shown in Table 11.

TABLE 11

| | A4 | A6 | A8 | A10 |
|---|---|---|---|---|
| r11 | 0.8375e−02 | −.2220e−03 | 0.7573e−03 | −.5039e−05 |
| r12 | 0.2133e−01 | −.8547e−03 | 0.2398e−02 | 0.7882e−05 |
| r16 | 0.5576e−03 | −.4129e−03 | −.1417e−03 | 0.1193e−03 |
| r17 | 0.1688e−03 | −.5226e−04 | −.3725e−03 | 0.1849e−03 |

The values of dz/fw, f1/fa, |f2/fa|, f3/fa, and f4/fa corresponding to f, Fno, 2ω and the conditional expressions (1), (2), (3), (4), and (5) in example 3 of a set of numerical values are shown in Table 12.

TABLE 12

| f | 1.00 to 30.63 |
|---|---|
| Fno | 1.69 to 3.63 |
| 2ω | 33.23 to 1.15 |

TABLE 12-continued

| | |
|---|---|
| dz/fw | 8.33 |
| f1/fa | 2.13 |
| \|f2/fa\| | 0.34 |
| f3/fa | 1.83 |
| f4/fa | 0.80 |

Figures 10A, 10B, 10C:
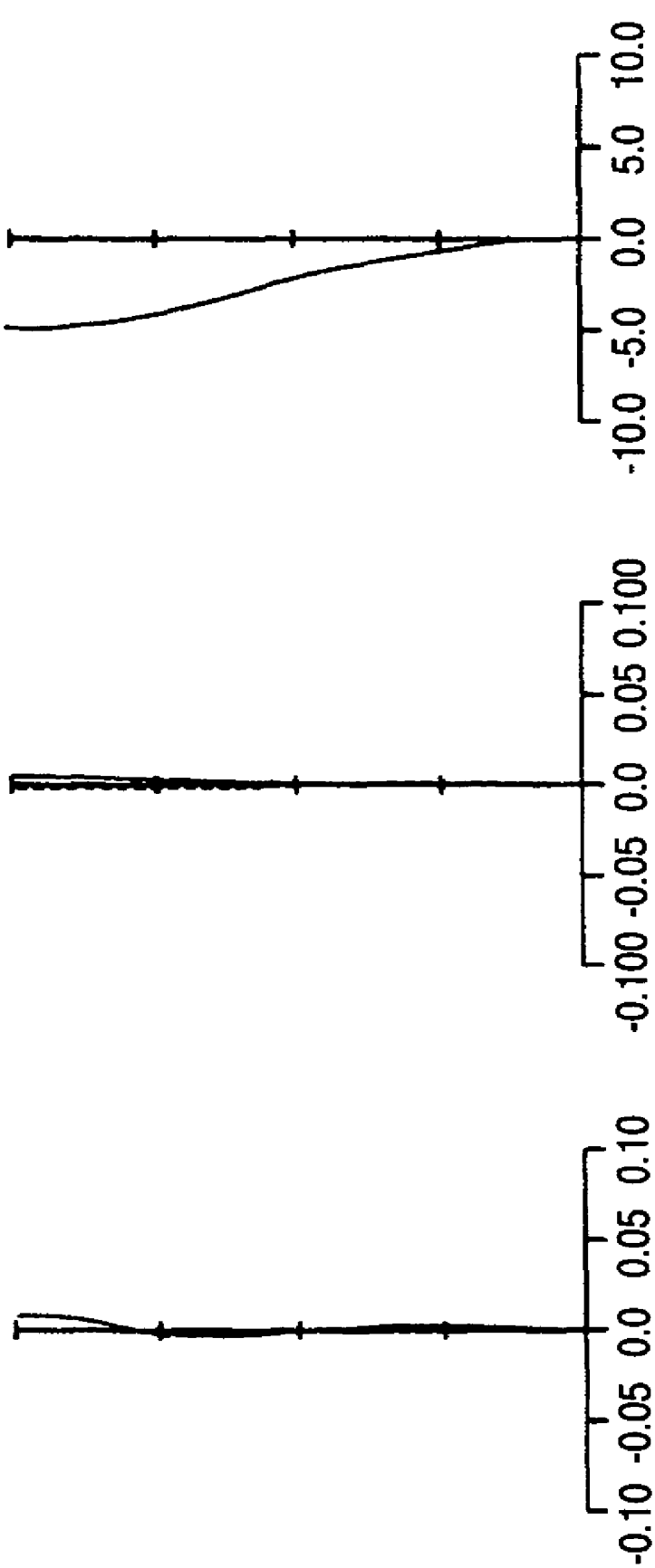
FIG. 10 is a diagram illustrating various aberrations of example 3 of a set of numerical values obtained by applying specific numerical values to the third mode of practice, together with FIGS. 11 and 12, illustrating spherical aberration, astigmatism, and distortion at the wide angle end.

FIGS. 10 to 12 show aberration diagrams of spherical aberrations, astigmatisms, and distortions at the wide angle end, standard focal distance, and far end of the zoom lens 3.

As can be understood from the above-described embodiments and examples of a set of numerical values, zoom lenses according to embodiments of the present invention have high zoom ratios exceeding 20× (high zoom ratios of about 30× in the above examples of numerical values) with a small number of lens elements by satisfying the conditional expressions (1), (2), (3), (4), and (5). For example, the zoom lenses are preferably used as zoom lenses for video cameras.

Figure 13:
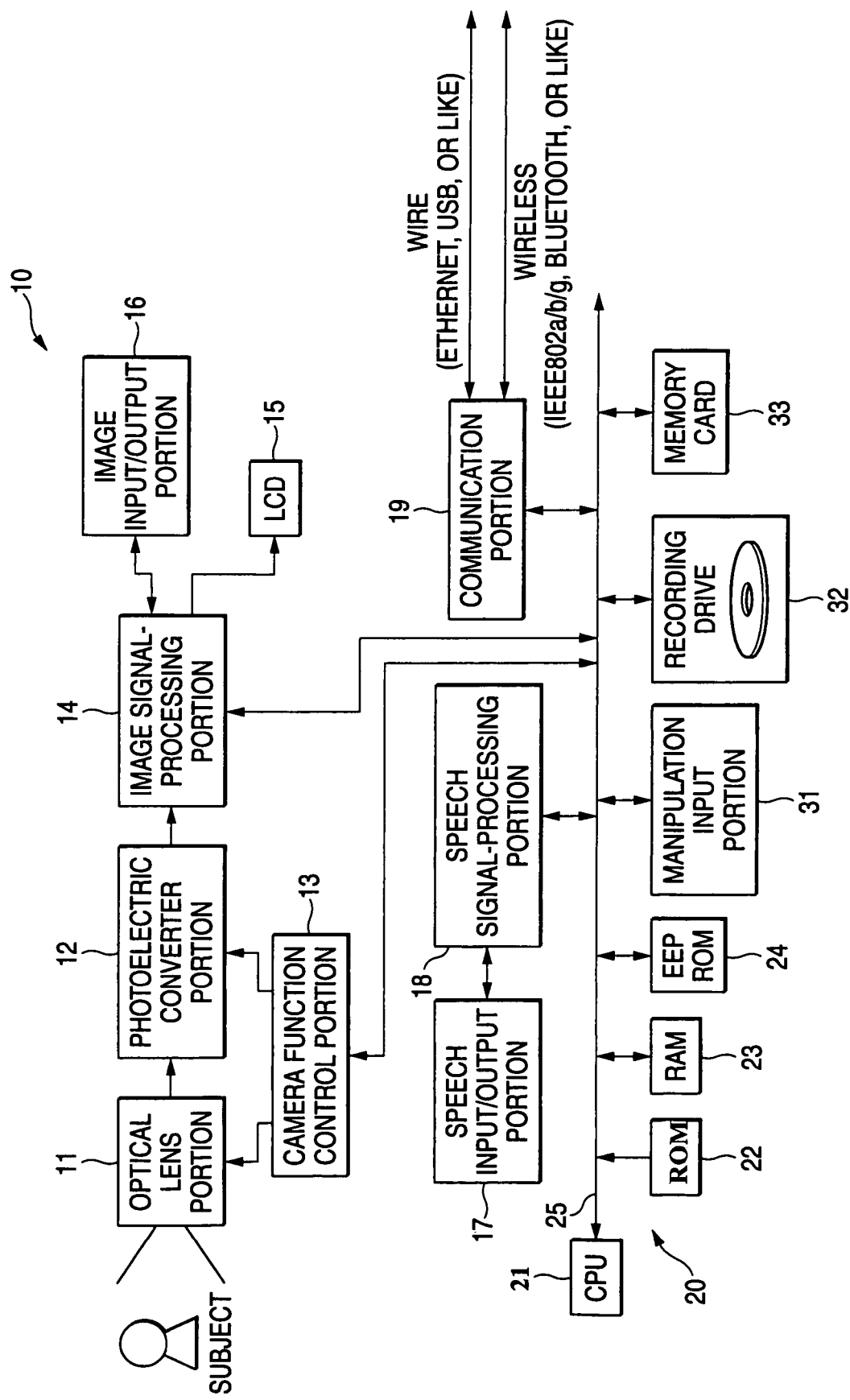
FIG. 13 is a block diagram showing a mode of practice of an image pickup device according to the present invention.

FIG. 13 shows a mode of practice of an image pickup device according to an embodiment of the present invention. In this mode of practice, the image pickup device according to an embodiment of the invention is utilized as a digital video camera.

The digital video camera 10 according to this mode of practice has an optical lens portion 11, a photoelectric converter portion 12, a camera function control portion 13, an image signal-processing portion 14, an LCD (liquid crystal display) 15, an image input/output portion 16, a speech input/output portion 17, a speech signal-processing portion 18, a communication portion 19, a control portion 20, a manipulation input portion 31, a recording drive 32 (such as a disk drive or tape drive), and a memory card 33.

The optical lens portion 11 has a zoom lens, a focus mechanism, a stop-down mechanism, a shutter mechanism, a zoom mechanism, and other parts. The lens portion controls the focus mechanism, stop-down mechanism, shutter mechanism, and zoom mechanism, takes in an image of a desired subject, and brings the image into focus onto a desired portion of the photoelectric converter portion 12 in response to a drive signal from the camera function control portion 13. Any of the above-described zoom lenses according to embodiments of the present invention is used. In particular, any one of the zoom lenses 1, 2, and 3 associated with the above-described first through third modes of practice or a zoom lens (not shown) according to an embodiment of the present invention is used.

The photoelectric converter portion 12 has an image pickup device (such as CCD (charged coupled device) or CMOS (complementary metal-oxide semiconductor)), a processing circuit, and other parts. The converter portion 12 converts an image of the subject taken in by the optical lens portion 11 into an electrical signal (image signal) by the image pickup device and pretreats the obtained image signal by a pretreatment circuit of the photoelectric converter portion 12 in a desirable manner. In the pretreatment circuit of the photoelectric converter portion 12, the S/N ratio is kept well, for example, by performing CDS (correlated double sampling) processing, and performs other processing such as control of the gain by performing AGC (automatic gain control) processing. The image signal that has undergone given pretreatment is converted into a digital signal (A/D (analog-to-digital) conversion), which in turn is supplied to the image signal-processing portion 14.

The image signal-processing portion 14 is made of a DSP (digital signal processor), and performs camera signal processing (such as AF (auto focus), AE (auto exposure), and AWB (auto white balance)) on the image data from the photoelectric converter portion 12 under control of the control portion 20.

An analog image signal to be supplied to the LCD 15 is created from the image data that has undergone the camera signal processing. By supplying this to the LCD 15, the image of the subject can be checked through the LCD 15. In the case of the digital video camera according to this mode of practice, the analog image signal from the image signal-processing portion 14 can be simultaneously supplied to an external device such as another recording/playback device or monitor receiver through the image input/output portion 16.

The image signal-processing portion 14 compresses the image data that has undergone the camera signal processing by a predetermined compression method, and records the data on a recording medium or memory card 33 loaded in the recording drive 32 through the control portion 20. A hard disk, a detachable disk type recording medium (such as DVD (digital versatile disc)-RAM or DVD-RW/R), or magnetic tape loaded in a cassette can be used as the recording medium for the recording drive 32. When motion pictures are taken, for example, the shooting start key is again manipulated. Images of the subject are taken in successively until an instruction for stopping the photography of motion pictures is given. The images are recorded as video data onto the recording medium of the recording drive 32. When the shutter key is manipulated, the image focused onto the photoelectric converter portion 12 is accepted as a still image and recorded onto the memory card 33 as still image data. The memory card 33 is detachably mounted in a card slot (not shown). The still image data can also be recorded on the recording medium of the recording drive 32, and the video data can be recorded on the memory card 33.

When motion pictures are taken, sound is picked up through a microphone (not shown) and converted into an electrical signal to thereby obtain a speech signal. The speech signal is converted into a digital signal. Data about this can be compressed by a given compression method and be recorded on the recording medium of the recording drive 32 together with the video data.

In this digital video camera 10, an analog image signal that is information supplied from an external device such as a video tape recorder and has been accepted through the image input/output portion 16 and an analog speech signal accepted through the speech input/output portion 17 can also be recorded on the recording medium of the recording drive 32.

The control portion 20 controls the various portions of the digital video camera 10. A CPU (central processing unit) 21, a ROM (read only memory) 22, a RAM (random access memory) 23, and an EEPROM (electrically erasable and programmable ROM) 24 are connected through a system bus 25 to constitute the configuration of a microcomputer.

Various kinds of processing programs executed by the CPU 21 and information used in various kinds of processing have been previously recorded in the ROM 22. The RAM 23 is used chiefly as a working area such as to temporarily store intermediate results in various kinds of processing. The EEPROM 24 is a so-called nonvolatile memory and holds data that need to be held in cases where the power supply of the digital video camera is turned off such as various kinds of setting parameters.

In this digital video camera 10, it is possible to record motion picture data, still image data, and speech data such as music received through the communication portion 19 and other various kinds of data on the recording medium of the recording drive 32. The communication portion 19 can send and receive data through Ethernet™ or a wired interface such as a USB (universal serial bus). Furthermore, the communication portion sends and receives data through a wireless interface such as IEEE (Institute of Electrical and Electronics Engineers) 802.11a/b/g or Bluetooth.

Digital data recorded on the recording medium of the recording drive 32 or the like can be supplied through the communication portion 19 to an external device connected with a network.

The above-described image pickup device 10 is a digital video camera to which an embodiment of the present invention is applied. The image pickup device can assume various other forms as commercial products. For example, the image pickup device can be widely applied as a digital still camera, a cell phone having a built-in camera, a PDA (personal digital assistant) having a built-in camera, and the camera portion of other digital input/output device.

It is to be understood that all of the specific shapes of various portions and numerical values shown in the above-described modes of practice and examples of numerical values merely show examples of implementation when the present invention is implemented, and that the technical scope of the present invention should not be construed restrictively thereby.

What is claimed is:

1. A zoom lens comprising 10 or less lens elements and having a zoom ratio of more than 20×, said zoom lens having first, second, third, and fourth groups of lens elements placed in turn from object side to image side;

wherein the first group of lens elements has positive refractive power and is fixed in position during zooming;

wherein the second group of lens elements has negative refractive power and is moved in position during zooming;

wherein the third group of lens elements has positive refractive power, includes at least one aspheric surface, and is fixed in position during zooming;

wherein the fourth group of lens elements has positive refractive power, includes at least one aspheric surface, corrects variations in image surface position during zooming, and performs focusing; and wherein the zoom lens satisfies the following conditional expression (1):

$$7.8 < \frac{dz}{fw} < 8.8 \quad (1)$$

where dz is the movable distance of the second group of lens elements to perform zooming and fw is the focal distance of the whole lens system at a wide angle end;

wherein the third group of lens elements is made of a single lens element having an aspheric convex surface on an object side and an aspheric convex surface on an image side;

wherein the fourth group of lens elements is made up of a negative lens element and a positive lens element placed in turn from object side to image side; and wherein the positive lens element located on the image side has an aspheric surface on the image side.

2. A zoom lens as set forth in claim 1, wherein the following conditional expressions (2), (3), (4), and (5) are satisfied:

$$2.0 < \frac{f1}{fa} < 2.3 \quad (2)$$

$$0.25 < \left|\frac{f2}{fa}\right| < 0.41 \quad (3)$$

$$0.58 < \frac{f3}{fa} < 3.25 \quad (4)$$

$$0.7 < \frac{f4}{fa} < 0.9 \quad (5)$$

where $fa=\sqrt{fw \cdot ft}$, in which ft is the focal distance of the whole lens system at a far end, and $f_i$ is the focal distance of the ith group of lens elements (i=1, 2, 3, 4).

3. A zoom lens as set forth in claim 2, wherein the third group of lens elements is made of a single lens element having an aspheric convex surface on the object side and an aspheric concave surface on the image side; and wherein the fourth group of lens elements has a negative lens element, a first positive lens element, and a second positive lens element placed in turn from object side to image side, and at least one surface of the second positive lens element on the image side is aspheric.

4. A zoom lens as set forth in claim 1, wherein the whole lens system is made up of nine lens elements.

5. A zoom lens as set forth in claim 1, wherein the whole lens system is made up of ten lens elements.

6. An image pickup device comprising a zoom lens and an image pickup unit converting an image formed by the zoom lens into an electrical signal, the zoom lens being made up of ten or less lens elements, the zoom lens having a zoom ratio exceeding 20×;

wherein said zoom lens has first, second, third, and fourth groups of lens elements placed in turn from object side to image side;

wherein said first group of lens elements has positive refractive power and is fixed in position during zooming;

wherein said second group of lens elements has negative refractive power and is moved in position during zooming;

wherein said third group of lens elements has positive refractive power, includes at least one aspheric surface, and is fixed during zooming;

wherein said fourth group of lens elements has positive refractive power, includes at least one aspheric surface, corrects variations in image surface position during zooming, and performs focusing; and wherein the zoom lens satisfies the following conditional expression (1):

$$7.8 < \frac{dz}{fw} < 8.8 \quad (1)$$

where dz is the movable distance of the second group of lens elements to perform zooming and fw is the focal distance of the whole lens system at a wide angle end, and wherein the third group of lens elements is made of a single lens element having an aspheric convex surface on an object side and an aspheric convex surface on an image side;

wherein the fourth group of lens elements is made up of a negative lens element and a positive lens element placed in turn from object side to image side; and wherein the positive lens element located on the image side has an aspheric surface on the image side.

7. An image pickup device as set forth in claim 6, wherein said zoom lens satisfies the following conditional expressions (2), (3), (4), and (5):

$$2.0 < \frac{f1}{fa} < 2.3 \quad (2)$$

$$0.25 < \left|\frac{f2}{fa}\right| < 0.41 \quad (3)$$

$$0.58 < \frac{f3}{fa} < 3.25 \quad (4)$$

$$0.7 < \frac{f4}{fa} < 0.9 \quad (5)$$

where $fa = \sqrt{fw \cdot ft}$, in which ft is the focal distance of the whole lens system at the far end, and $f_i$ is the focal distance of the ith group of lens elements (i=1, 2, 3, 4).

8. A zoom lens (1) comprising ten or less lens elements and having a zoom ratio of more than 30×, said zoom lens having first, second, third, and fourth groups (GR1, GR2, GR3, GR4) of lens elements placed in turn from object side to image side;

wherein the first group (GR1) of lens elements has positive refractive power and is fixed in position during zooming;

wherein the second group (GR2) of lens elements has negative refractive power and is moved in position during zooming;

wherein the third group (GR3) of lens elements has positive refractive power, includes at least one aspheric surface, and is fixed in position during zooming;

wherein the fourth group (GR4) of lens elements has positive refractive power, includes at least one aspheric surface, corrects variations in image surface position during zooming, and performs focusing; and wherein the zoom lens (1) satisfies the following conditional expression (1):

$$8.29 \leq \frac{dz}{fw} < 8.8\_ \quad (1)$$

wherein dz is the movable distance of the second group (GR2) of lens elements to perform zooming and fw is the focal distance of the whole lens system at a wide angle end.

9. A zoom lens (1) comprising nine or less lens elements and having a zoom ratio of more than 20×, said zoom lens having first, second, third, and fourth groups (GR1, GR2, GR3, GR4) of lens elements placed in turn from object side to image side;

wherein the first group (GR1) of lens elements has positive refractive power and is fixed in position during zooming;

wherein the second group (GR2) of lens elements has negative refractive power and is moved in position during zooming;

wherein the third group (GR3) of lens elements has positive refractive power, includes at least one aspheric surface, and is fixed in position during zooming;

wherein the fourth group (GR4) of lens elements has positive refractive power, includes at least one aspheric surface, corrects variations in image surface position during zooming, and performs focusing; and wherein the zoom lens (1) satisfies the following conditional expression (1):

$$8.29 \leq \frac{dz}{fw} < 8.8\_ \quad (1)$$

wherein dz is the movable distance of the second group (GR2) of lens elements to perform zooming and fw is the focal distance of the whole lens system at a wide angle end.

10. A zoom lens (1) comprising ten or less lens elements and having a zoom ratio of more than 20×, said zoom lens having first, second, third, and fourth groups (GR1, GR2, GR3, GR4) of lens elements placed in turn from object side to image side;

wherein the first group (GR1) of lens elements has positive refractive power and is fixed in position during zooming;

wherein the second group (GR2) of lens elements has negative refractive power and is moved in position during zooming;

wherein the third group (GR3) of lens elements has positive refractive power, includes at least one aspheric surface, and is fixed in position during zooming;

wherein the fourth group (GR4) of lens elements has positive refractive power, includes at least one aspheric surface, corrects variations in image surface position during zooming, and performs focusing; and wherein the zoom lens (1) satisfies the following conditional expression (1):

$$8.29 \leq \frac{dz}{fw} < 8.8\_ \quad (1)$$

wherein dz is the movable distance of the second group (GR2) of lens elements to perform zooming and fw is the focal distance of the whole lens system at a wide angle end, wherein the third group (GR3) of lens elements is made of a single lens element having an aspheric convex surface on an object side and an aspheric convex surface on an image side;

wherein the fourth group (GR4) of lens elements is made up of a negative lens element and a positive lens element placed in turn from object side to image side; and wherein the positive lens element located on the image side has an aspheric surface on the image side.

11. A zoom lens (1) as set forth in any one of claims 8, 9 or 10, wherein the following conditional expressions (2), (3), (4), and (5) are satisfied:

$$2.0 < \frac{f1}{fa} < 2.3 \quad (2)$$

$$0.25 < \left|\frac{f2}{fa}\right| < 0.41 \quad (3)$$

$$0.58 < \frac{f3}{fa} < 3.25 \quad (4)$$

-continued $$0.7 < \frac{f4}{fa} < 0.9 \quad (5)$$

where $fa=\sqrt{fw \cdot ft}$, in which ft is the focal distance of the whole lens system at a far end, and $f_i$ is the focal distance of the ith group of lens elements (i=1, 2, 3, 4).

12. An image pickup device comprising a zoom lens (I) according to one of the claims 8, 9, and 10 and an image pickup unit converting an image formed by the zoom lens into an electrical signal.

13. An image pickup device comprising a zoom lens (I) according to one of the claim 11 and an image pickup unit converting an image formed by the zoom lens into an electrical signal.

* * * * *